April 9, 1940.  J. E. GIROUX  2,196,553
HAND ACCELERATOR FOR MOTOR VEHICLES
Filed Sept. 14, 1939  2 Sheets-Sheet 1
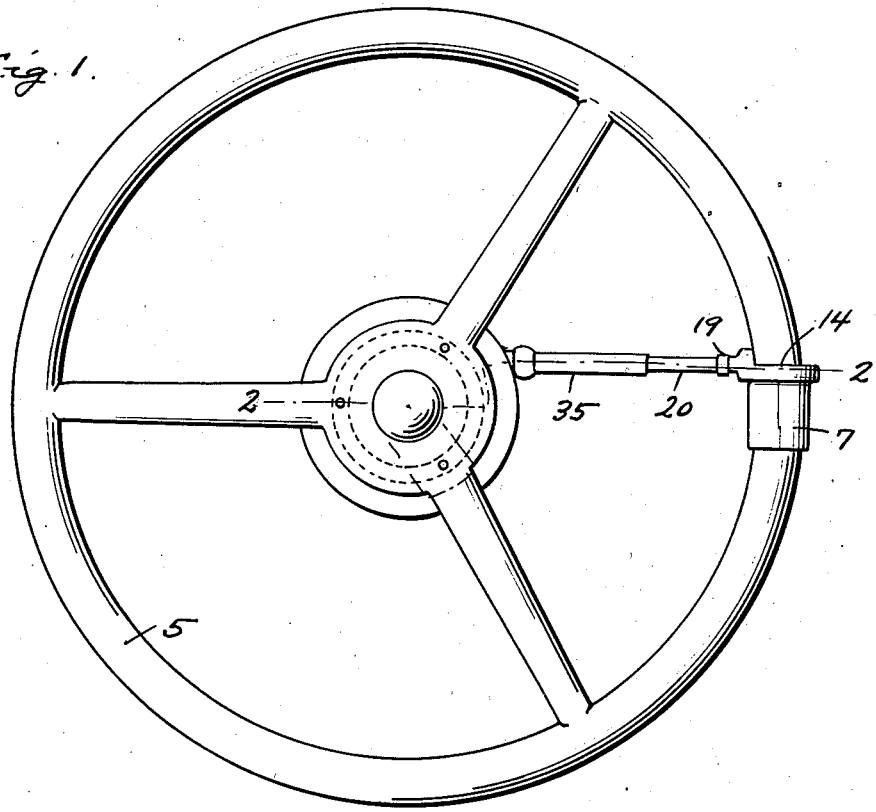
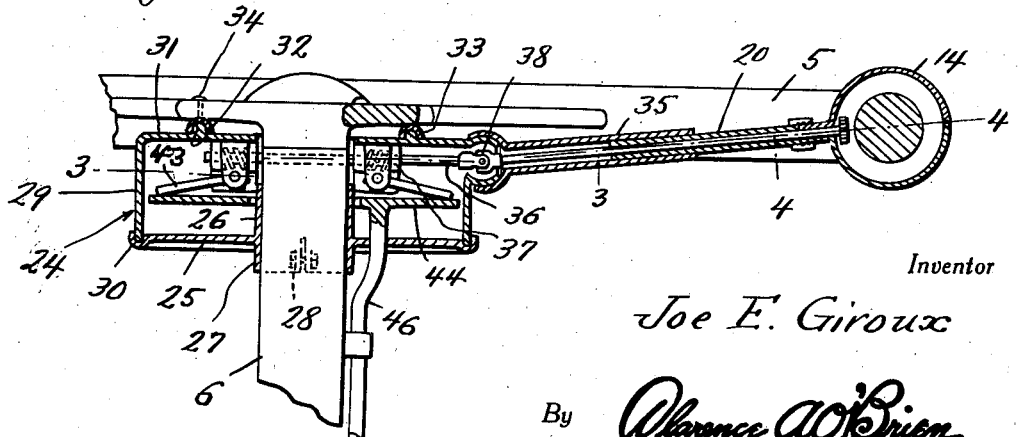
Inventor
Joe E. Giroux
By Clarence A. O'Brien
and Hyman Berman
Attorneys April 9, 1940.    J. E. GIROUX    2,196,553
HAND ACCELERATOR FOR MOTOR VEHICLES
Filed Sept. 14, 1939    2 Sheets-Sheet 2
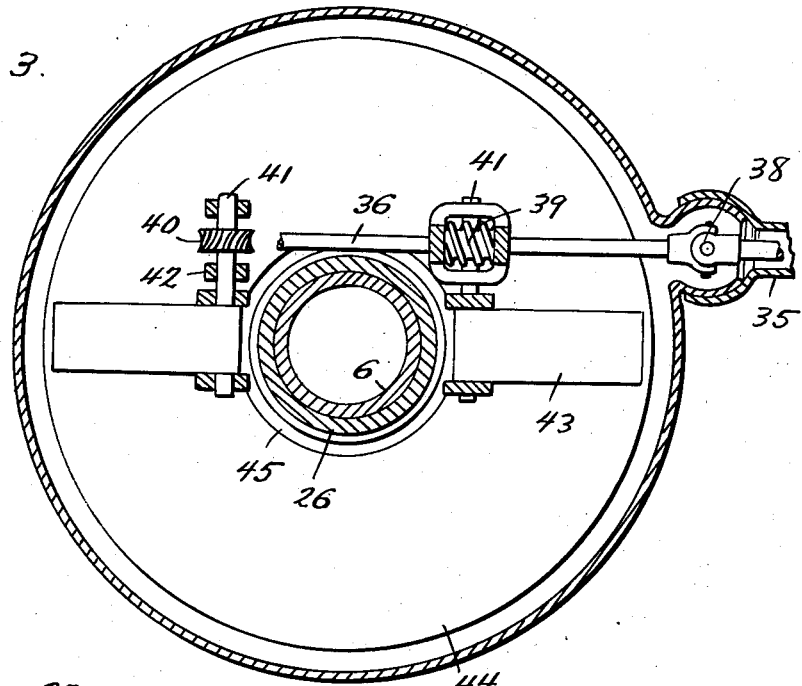
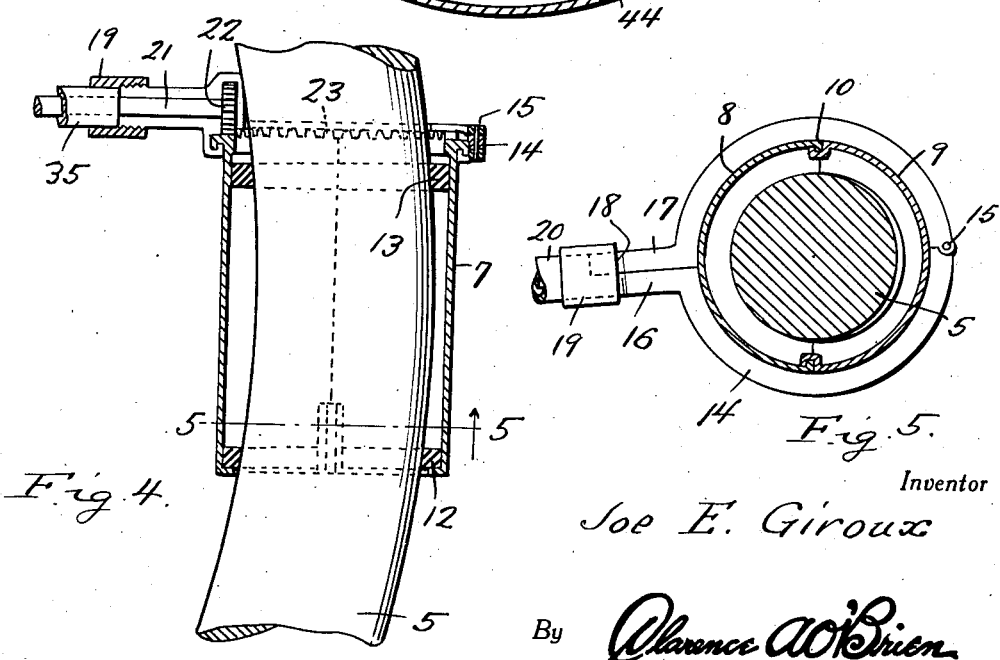
Inventor
Joe E. Giroux
By Clarence A. O'Brien
and Hyman Berman
Attorneys Patented Apr. 9, 1940

2,196,553

UNITED STATES PATENT OFFICE 2,196,553

HAND ACCELERATOR FOR MOTOR VEHICLES

Joseph E. Giroux, Flint, Mich.

Application September 14, 1939, Serial No. 294,954

4 Claims. (Cl. 74—486)

The present invention relates to accelerator attachments for motor driven vehicles and has for its primary object to provide a mechanism of this character controlled from a position on the steering wheel and thus relieve the driver from the necessity of maintaining his foot on the accelerator while driving the car.

An important object of the present invention is to provide an accelerator device of this character which is mounted on the steering wheel of the vehicle and embodying a mechanism which will maintain the accelerator in a predetermined position without requiring the accelerator to be gripped by the driver.

A still further object is to provide a device of this character which may be easily and conveniently installed in position on the steering wheel of the vehicle without necessitating any changes in the construction thereof and which at the same time is of simple and practical construction, efficient and reliable in performance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout and in which:

Figure 1 is a top plan view.

Figure 2 is a fragmentary sectional view taken substantially on a line 2—2 of Fig. 1.

Figure 3 is a similar view taken substantially on a line 3—3 of Fig. 2.

Figure 4 is a sectional view through the control sleeve mounted on the steering wheel taken substantially on a line 4—4 of Fig. 2 and Figure 5 is a transverse sectional view taken substantially on a line 5—5 of Fig. 4.

Referring now to the drawings in detail wherein for the purpose of illustration I have disclosed a preferred embodiment of the invention the numeral 5 designates a steering wheel of conventional construction which is mounted on the steering post 6. A manually operable accelerator control sleeve 7 is mounted on the wheel 5, the sleeve 7 being composed of a pair of longitudinally split sections 8 and 9 having their longitudinal edges provided with an interfitting connection as shown at 10. Bearings 12 and 13 are mounted in the sleeve adjacent each end thereof to space the sleeve from the wheel 5 to facilitate the rotation of the sleeve on the wheel. The sleeve is retained in position on the wheel against circumferential sliding movement by means of a clamping ring 14 formed of a pair of split sections and hingedly at one end as shown at 15. The other ends of the split sections of the ring are provided with tubular extensions 16 and 17 having a portion thereof threaded as shown at 18 and adapted, when the sections are in closed position to receive a locking ring 19 which is threaded on the extension to secure the sections in closed position about the sleeve 7.

The tubular extensions 16 and 17 continue radially outwardly to form a tubular housing 20 within which a shaft 21 is journaled, one end of the shaft being provided with a pinion gear 22 which is engaged with the ring gear 23 formed on one end of a sleeve 7. A housing designated generally at 24 is mounted on the steering post 6, the housing including a bottom 25 including a tubular central portion 26 from which a split collar 27 extends below the housing for clamping to the steering post by means of a bolt 28. The lower edge of the side walls 29 of the housing is seated in a channel 30 formed adjacent the edge of the bottom 25 and adapted for rotation on said bottom portion. The top 31 of the housing is formed with an annular upstanding rib 32 positioned in an inverted channel guide 33 which is secured to the steering wheel 5 by means of bolts 34 or the like. Projecting from one side of the upper portion of the housing is a tubular extension 35 which telescopically receives the shaft housing 20.

A shaft 36 is journaled in bearing brackets 37 depending from the underside of the top 31 and is connected to the shaft 21 by means of a universal joint 38. Fixed to the shaft 36 is a pair of worms 39 engaging worm gears 40 keyed to a pair of shafts 41—41 also journaled in bearing brackets 42—42 depending from the underside of the top 31 of the housing. Plates 43—43 are fixedly secured at one end to the shafts 41 and have their free ends projecting radially from opposite sides of the steering post for engaging a circular plate 44 provided with a central opening 45 to accommodate the steering post, said circular plate being positioned in the housing as clearly shown in Fig. 2 of the drawings. A rod 46 extends downwardly from the circular plate through the bottom 25 of the housing and is adapted for connection with the throttle of the carburetor of the engine of the vehicle (not shown).

From the foregoing it will be apparent that upon the rotation of the sleeve 7 that the plates 43 will be raised or lowered depending upon the direction of rotation of the sleeve and a depressing movement of the plates 43 will cause the circular plate 44 to be moved downwardly whereby to also move the rod 46 downwardly and thus control the throttle of the engine. The upper portion of the housing 24 is adapted to rotate freely on the fixedly secured bottom portion 25 of the housing and accordingly when the steering wheel 5 is manipulated during the steering of the vehicle all of the parts of the device except the bottom 25 and the disc 44 and its operated rod 46 will likewise be rotated.

By reason of the worm drive connection between the plates 43 and the sleeve 7 it will be apparent that the plates will be maintained in a predetermined position after being actuated by the sleeve 7. Likewise in the usual throttle construction of a carbureter the throttle is returned to its closed position by means of spring devices which likewise would be employed for returning the disc 44 to its upper position.

It is believed the details of construction and manner of operation of the device will be readily understood from the foregoing without further detailed explanation.

What is claimed is:

1. A hand operated accelerator for motor vehicles comprising a rotatable hand gripping member adapted for mounting on a steering wheel, a circular plate having a carburetor throttle operating rod extending therefrom, said plate and rod being mounted for vertical reciprocating movement, a pivoted plate having a free end engaging the first named plate to actuate the latter, said pivoted plate being rotatable about the axis of said circular plate and an operative connection between the pivoted plate and the member.

2. A hand operated accelerator for motor vehicles comprising a rotatable hand gripping member adapted for mounting on a steering wheel, a circular plate having a carburetor throttle operating rod extending therefrom, said plate and rod being mounted for vertical reciprocating movement, a pivoted plate having a free end engaging the first named plate to actuate the latter, said pivoted plate being rotatable about the axis of said circular plate, a shaft operated by the member and a worm gear operating connection between the shaft and the pivoted plate.

3. An accelerator for motor vehicles comprising a sleeve adapted for rotatably mounting on the steering wheel of the vehicle, a circular plate beneath the steering wheel and having operative connection with the carburetor throttle of the engine, said circular plate being mounted for vertical movement, a shaft operated by the sleeve, a plurality of plates having one end free and bearing against the circular plate, means pivotally supporting the other ends of the last named plates and an operative connection between the shaft and the pivoted ends of the last named plates.

4. An accelerator control mechanism for motor driven vehicles comprising a sleeve adapted for rotatably attaching on the steering wheel of the vehicle, said sleeve having gear teeth at one end, a housing rotatably supported on the steering wheel post, a shaft projecting from the housing and having a pinion at its outer end operatively engaged with the gear teeth of said sleeve, a vertically movable circular plate in the housing having a throttle operating rod extending therefrom, a plurality of plates pivoted at one end to the housing and having their free ends bearing against the circular plate and an operating connection between the pivoted ends of the last named plates and said shaft to pivotally actuate the last named plates upon a rotation of said sleeve.

JOSEPH E. GIROUX.